Patented Feb. 15, 1949

2,461,842

UNITED STATES PATENT OFFICE 2,461,842

CONDENSATION OF NITRILES WITH AMIDES AND THE PRODUCTION OF BETA-ALANINE

John F. Olin, Grosse Ile, Mich., assignor to Sharples Chemicals Inc., a corporation of Delaware No Drawing. Application February 26, 1943, Serial No. 477,267

6 Claims. (Cl. 260—465.5)

This invention relates to a new and economical process of making beta-alanine and related compounds, to a new source of compounds formed as intermediates in practice of such a process and to the individual steps of the process by which the new intermediates are first produced and thereafter treated to obtain beta-alanine and related compounds.

While the invention is applicable to manufacture of a variety of derivatives of beta-alanine and a variety of intermediate compounds suitable for formation of these derivatives, it was originally conceived as a method of preparing beta-alanine. A large number of processes have been proposed in the prior art for manufacture of this compound, including reaction of ammonia on beta-iodopropionic acid, hydrolysis of methyl carbomethoxy beta-aminoproprionate, reduction of beta-nitrosopropionic acid, reaction of ethyl acrylate with alcoholic ammonia, manufacture from succinylglycine ester by the azide synthesis, reaction of liquid ammonia on methyl acrylate, reduction of cyanoacetic acid with zinc and sulphuric acid, reduction of beta-oximino-propionic acid with sodium amalgam and water, reduction of isoserine with hydrogen iodide and red phosphorous, reaction of $\gamma$-nitro propyl phthalimide with concentrated hydrochloric acid, reaction of 2,4-dioxo-pyrimidinhexahydride with concentrated hydrochloric acid, hydrolysis of carnosin with barium hydroxide solution, and catalytic hydrogenation of cyano-acetic acid. Each of these methods presents, however, at best a relatively expensive method of producing beta-alanine, either because of the expensiveness of the starting material, because of the relatively poor yields obtained in the practice of the process, or for both of these reasons. A feature of the present invention consists in the fact that it provides a method of producing beta-alanine and related compounds and intermediates in good yields from relatively inexpensive starting materials, and by relatively inexpensive procedure.

The novel process of the invention involves, as a first step, reaction between an amide and an $\alpha,\beta$ unsaturated aliphatic nitrile to form a beta-acyl amido aliphatic nitrile, as represented by the following equation:

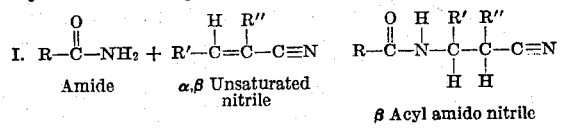

Amide    $\alpha,\beta$ Unsaturated nitrile    $\beta$ Acyl amido nitrile in which R represents a lower alkyl or phenyl radical or hydrogen and R' and R'' represent, respectively, hydrogen or the same or different aliphatic, cycloaliphatic or aromatic radicals.

In the second reaction step of the invention, the beta-acyl amido nitrile resultant of Equation I is hydrolyzed to form a beta-amino-aliphatic acid, this step of hydrolysis being preferably accomplished by treatment with water and an inorganic acid, preferably hydrochloric acid. This reaction is represented by the following equation:

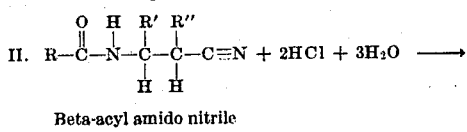

Beta-acyl amido nitrile

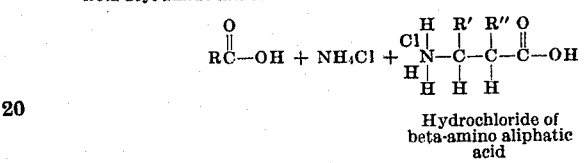

Hydrochloride of beta-amino aliphatic acid

The inorganic acid salt resultant of Equation II is next neutralized by treatment with a base to cause splitting to form the corresponding beta-amino acid, which will be beta-alanine or a derivative thereof, depending upon whether R' and R'' represent hydrogen or organic radicals. Preferred procedure involves neutralization with an aliphatic amine, as indicated by the following equation:

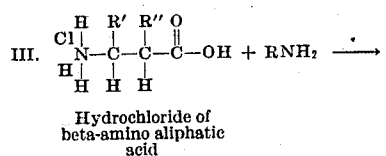

Hydrochloride of beta-amino aliphatic acid

While the invention may be applied in preparation of various amidopropionitriles and various derivatives of beta-alanine by proper choice of the amide and acylonitrile derivatives employed in the step of Equation I, it will be explained, for the sake of simplicity, in its relation to manufacture of beta-acetamido propionitrile from acetamide and acrylonitrile and conversion of the resulting beta-acetamidopropionitrile into beta-alanine. From this description, persons skilled in the art will be able to practice the invention in treating other alpha, beta unsaturated nitriles with other amides (e. g., aliphatic amides such as propionamide or butyramide), with such minor modifications of technique as may be desirable. Thus, in the practice of the invention, best results are attained by use of alkaline catalysts to promote the condensation reaction of Equation I, and these catalysts and other features of the invention are applicable, regardless of whether the condensation and hydrolysis reactions involve acrylonitrile or other alpha, beta unsaturated nitriles (e. g., methacrylonitrile or crotonitrile), and regardless of whether they involve use of acetamide or other amides (e. g., butyramide, propionamide or benzamide) as the amide reactant. In the practice of the invention, it is immaterial, from the standpoint of the production of beta-alanine, whether acetamide or some other amide is condensed with acrylonitrile, for the beta-amidopropionitrile formed as the reaction product may be hydrolyzed to form beta-alanine regardless of the particular amide used, since the beta-amidopropionitrile is split at the amido nitrogen atom in the hydrolyzing reaction to form two molecules of organic acid, of which one is beta-alanine.

In the preferred process of manufacturing beta-alanine, the amide which is condensed with the acrylonitrile is acetamide, since this amide is preferable to others both because of relative cheapness and availability and because of the facility with which it enters into the reactions of the invention. The equations involved in practice of the invention when acetamide and acrylonitrile are the starting materials are as follows:

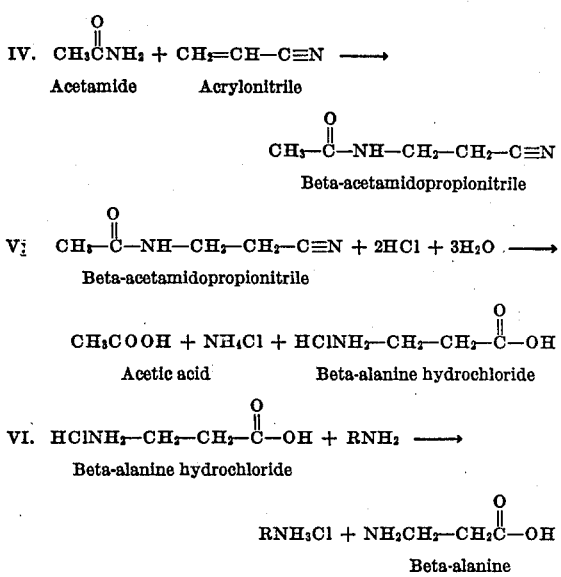

In the manufacture of beta-acetamidopropionitrile and beta-alanine from acetamide and acrylonitrile, the acetamide is preferably dehydrated by azeotropic distillation with benzene, toluene, xylene or equivalent water entraining agent before being condensed with the acrylonitrile. An alkaline catalyst is then added which, when dissolved in the acetamide, will impart to the solution an alkaline reaction. Various alkaline catalysts, such as the alcoholates, alkali metal and alkaline earth oxides, hydroxides or the metals themselves, quarternary ammonium bases, etc., may be used to catalyze the reaction. Acrylonitrile is added to the solution containing the catalyst, and after all of the acrylonitrile has been introduced, the reaction mixture is heated for a short time to insure complete reaction. After the reaction is completed, the catalyst is neutralized by addition of an acid such as phosphoric, oxalic or hydrochloric acid, and after neutralization of the catalyst, the reaction mixture is distilled under reduced pressure to separate the beta-acetamidopropionitrile from unreacted material and polymeric by-products. The resulting beta-acetamidopropionitrile is a white odorless solid melting at 66–67° C., boiling at 168–170° C. at 8 mm. of pressure, soluble in water and slightly soluble in ether and benzene.

The beta-acetamidopropionitrile is next hydrolyzed by treatment with water and an acid catalyst. Acetic acid formed in the hydrolysis reaction is removed by steam distillation. A substantial proportion of the ammonium salt of the catalytic acid is thereafter removed by evaporating the distillation residue to effect concentration, cooling the concentrated liquor to precipitate the salt, and filtering the precipitated salt from the aqueous solution. The acid salt of beta-alanine is dissolved by adding an aliphatic alcohol containing from one to four carbon atoms to the concentrated aqueous solution, and this causes the remaining ammonium salt to be precipitated from solution. Methanol is the preferred alcohol for this purpose. The ammonium salt is removed from the alcohol solution by filtration, and an amine is then added to that solution to neutralize the acid salt of beta-alanine, and the beta-alanine is thus precipitated and removed, the amine hydrochloride remaining in solution. The beta-alanine may then be washed free of adhering mother liquor with methanol, ethanol, propanol or butanol, dried and recrystallized from water-methanol, -ethanol, -propanol, or -butanol solutions if necessary for further purification.

*Example I*

12 grams of sodium were dissolved in 150 cc. of methanol and added to 590 grams (10 moles) of acetamide in a three liter, three neck flask equipped with a stirrer, reflux condenser, dropping funnel and thermometer. Excess methanol was distilled off, the reflux condenser replaced and 503 grams (9.5 moles) of acrylonitrile were added at such a rate that the temperature did not exceed 120° C. After standing overnight the mass was neutralized with 40 cc. of concentrated hydrochloric acid. Water and unreacted acrylonitrile were removed by reduced pressure evaporation and the residue was distilled through a tall Vigreux column under vacuum. The following fractions were obtained:

1. To 165°/18 mm., 200 grams (3.4 moles) acetamide.
2. 165°–195°/18 mm., 470 grams (4.2 moles) beta-acetamidopropionitrile.

*Example II*

A five liter, three neck flask was charged with 1770 grams (30 moles) of acetamide. The flask was equipped with a mercury seal stirrer, thermometer and a short indented column. The acetamide was dehydrated by azeotropic distillation with benzene and excess benzene then distilled off. Six grams of calcium were then added and caused to react by heating the reaction mixture. The mixture was allowed to stand overnight, and then heated to 100° C. and 1590 grams (30 moles) of acrylonitrile, which had been dried over calcium chloride were added slowly with continuous stirring while the temperature rose from 100° C. to 170° C. This mixture was heated one hour longer and allowed to stand overnight. The crude reaction mixture was warmed and neutralized with 18.9 grams of technical oxalic acid (.15 moles) in 150 cc. of water, filtered and distilled under reduced pressure. The following fractions were obtained:

1. To 100°/25 mm. Heads+306 grams of acrylonitrile.
2. 100°–175°/15 mm. 892 grams (15.1 moles) acetamide.
3. 175°–200°/15 mm. 1795 grams (16.0 moles) beta-acetamidopropionitrile.
4. Residue, 245 grams.

Example III 122 pounds of commercial acetamide was charged into a stainless steel reaction vessel of 35 gallons capacity which was equipped with a mixer and a reflux condenser bearing a decanter. Seven gallons of xylene was introduced and the mixture refluxed until water ceased to accumulate in the decanter. After the acetamide had cooled to 90–95°, 150 grams of metallic sodium was cautiously added. (Note: The amount of xylene is not critical, but should preferably provide a layer over the acetamide of sufficient depth to prevent excessive reaction between the sodium and acetamide.) After the sodium had reacted, 110 pounds of acrylonitrile was pumped in over a period of 45 minutes. The reaction mass was further heated at 155° for one hour then treated with 750 grams of concentrated phosphoric acid.

23 gallons of the crude material was distilled under reduced pressure to yield twenty-one pounds of acetamide distilling between 125 and 175° C. at 10–15 mm. and 75 pounds of beta-acetamidopropionitrile distilling between 175 and 200° C. at 15–20 mm.

Example IV

Beta-acetamidopropionitrile was hydrolyzed by adding 12½ gram moles of it to 1500 cc. of concentrated hydrochloric acid contained in a flask suitably equipped for steam distillation. Excess hydrogen chloride boiled out of the solution by the exothermic reaction was scrubbed from the vented gases with a suitable scrubbing apparatus. The solution was boiled four hours then steam distilled until the distillate was essentially free of acid, then evaporated to dryness. To leach the beta-alanine hydrochloride from ammonium chloride, 2600 cc. of methanol was used and the filtered methanol solution was added to 800 cc. of anhydrous monoethylamine in a flask equipped with a reflux condenser to return vaporized ethyl amine. Three washes with liter portions of methanol failed to yield beta-alanine containing less than ½% chloride ion so the crude material was recrystallized from a mixture of 650 cc. of methanol and 625 cc. of water to yield 508 grams of beta-alanine melting 199–200° C. containing less than 1/10% chloride ion.

Example V

A 75 gallon glass lined kettle equipped with a condenser bearing a scrubbing device and a steam jacket for heating the kettle was used to hydrolyze 167 pounds of beta-acetamidopropionitrile. The nitrile was placed in the kettle and 12 gallons of concentrated hydrochloric acid added. After the mixture was warmed and the initial reaction had begun to slacken 38 gallons more of the acid was added and the solution was heated to boiling for 6½ hours then steam distilled for 10½ hours. At the end of this distillation the solution was cooled and filtered. The filtrate was concentrated to a boiling temperature of 132° C., then diluted (after cooling) with 47 gallons of methanol. A quantity of ammonium chloride was filtered from the methanol solution, washed with 5 gallons of methanol and the methanol solution and washings returned to the hydrolysis kettle where 115 pounds of monobutylamine was added. The mixture was left with stirring and cooling overnight after which the beta-alanine was filtered off, washed three times with 8 gallons of methanol and dried. The yield was 92 pounds of beta-alanine melting at 199–200° C. with a chloride ion content of less than ½%.

Various modifications may be used in the practice of the invention. For example, instead of hydrolyzing the amidopropionitrile resultant of Equation I by treatment with water and an acid, this hydrolysis may be accomplished by treatment with water and a base, with subsequent splitting of the salt formed by reaction of the base with beta-alanine formed by the hydrolysis, as indicated by the following equations:

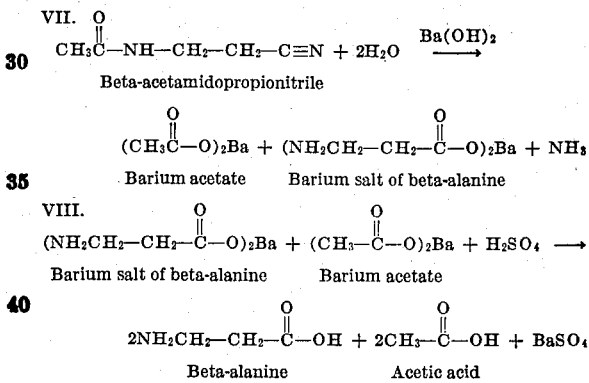

The following example illustrates such an alkaline hydrolysis.

Example VI

The alkaline hydrolysis of four gram moles of beta-acetamidopropionitrile was accomplished by heating it with four gram moles of barium hydroxide and three liters of water in an autoclave for three hours at 140–150°. The solution was boiled at atmospheric pressure until free of ammonia, then barium ions were removed by treatment with a very slight excess of sulphuric acid and after decantation and filtration of the solution, the solution was evaporated to dryness under reduced pressure to yield a syrup, which was taken up in dilute hydrochloric acid and evaporated to dryness. This residue was extracted with 700 cc. of methanol, filtered and the filtrate treated with triethyl amine until the beta-alanine was completely precipitated. After being washed with methanol the crude product melted at 150–160°, but one recrystallization from a mixture of methanol and water raised the melting point to 194–195° C. Approximately 100 grams of purified beta-alanine was obtained.

Still other modifications are available, and I do not wish to be limited except by the scope of the following claims.

I claim:
1. In the manufacture of beta-acetamidopropionitrile, the process comprising contacting acetamide with acrylonitrile in the presence of a basic catalyst until condensation has occurred between said acetamide and said acrylonitrile to form the beta-acetamido propionitrile.

2. As a new composition of matter, beta-acetamido propionitrile.

3. In the manufacture of a beta-acyl amido nitrile, the process comprising contacting an amide having the formula

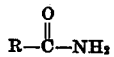

in which R is chosen from the class consisting of hydrogen, and lower alkyl and phenyl radicals, with a nitrile chosen from the class consisting of acrylonitrile, methacrylonitrile and crotonitrile in the presence of a basic catalyst until condensation has occurred between said amide and said nitrile to form the desired beta-acyl amido nitrile.

4. In the manufacture of beta-alanine, the process comprising contacting acetamide with acrylonitrile in the presence of a basic catalyst until condensation has occurred between said acetamide and said acrylonitrile to form beta-acetamido propionitrile and thereafter contacting the resulting beta-acetamido propionitrile with a hydrolytic agent chosen from the class consisting of acids and bases in the presence of water.

5. In the manufacture of a beta-amino aliphatic acid, the process comprising contacting an amide having the formula

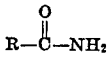

in which R is chosen from the class consisting of hydrogen, and lower alkyl and phenyl radicals, with a nitrile chosen from the class consisting of acrylonitrile, methacrylonitrile and crotonitrile in the presence of a basic catalyst until condensation has occurred between said amide and said nitrile to form the desired beta-acyl amido nitrile, and thereafter contacting the resulting beta-acyl amido nitrile with a hydrolytic agent chosen from the class consisting of acids and bases in the presence of water.

6. Compounds of the formula:

$$R-CO-NH-CH_2-CH_2-CN$$

in which R represents a lower alkyl radical.

JOHN F. OLIN.

REFERENCES CITED

The following references are of record in the file of this patent:

UNITED STATES PATENTS

| Number | Name | Date |
|---|---|---|
| 1,992,615 | Hoffman et al. | Feb. 26, 1935 |
| 2,017,537 | Hoffman et al. | Oct. 15, 1935 |
| 2,178,510 | Gerber | Oct. 31, 1939 |
| 2,222,993 | Toennies | Nov. 26, 1940 |
| 2,267,971 | Braun | Dec. 30, 1941 |
| 2,271,872 | Mitchell | Feb. 3, 1942 |
| 2,311,548 | Jacobson et al. | Feb. 16, 1943 |
| 2,369,839 | Moore | Feb. 20, 1945 |
| 2,401,429 | Kung | June 4, 1946 |

FOREIGN PATENTS

| Number | Country | Date |
|---|---|---|
| 457,621 | Great Britain | June 17, 1936 |
| 62,989 | Denmark | Dec. 11, 1944 |

OTHER REFERENCES

Weinstock et al., J. Am. Chem. Soc., vol. 61, pages 1421–1422.

Mittermair, Angew. Chem., vol. 54, page 53.

Williams et al., J. Am. Chem. Soc., vol. 62, pages 1784–1785.

Karrer, "Organic Chemistry" (1938), page 168.

Delepine, Bull. de la Soc. Chim. de France (3), fol. 29, page 1193.

Snell et al., J. of Bacteriology, vol. 38, page 303 (1939).